No. 791,151. PATENTED MAY 30, 1905.
G. W. KING, H. J. BARNHART & C. B. KING.
STEAM SHOVEL.
APPLICATION FILED JUNE 24, 1904.

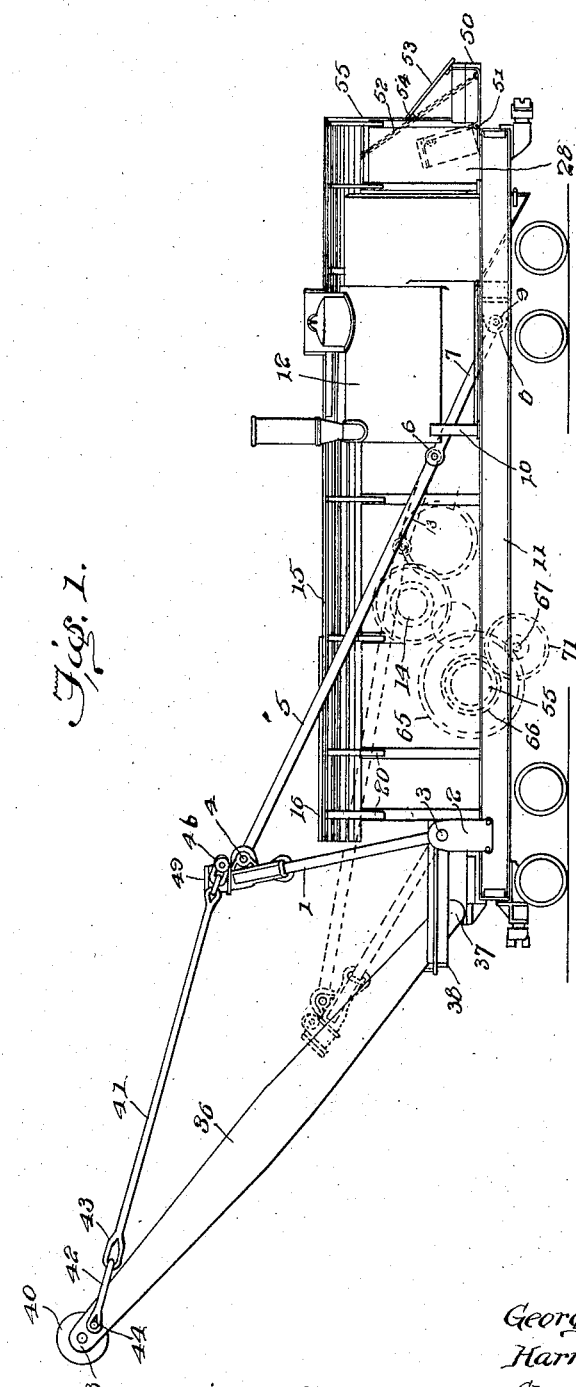

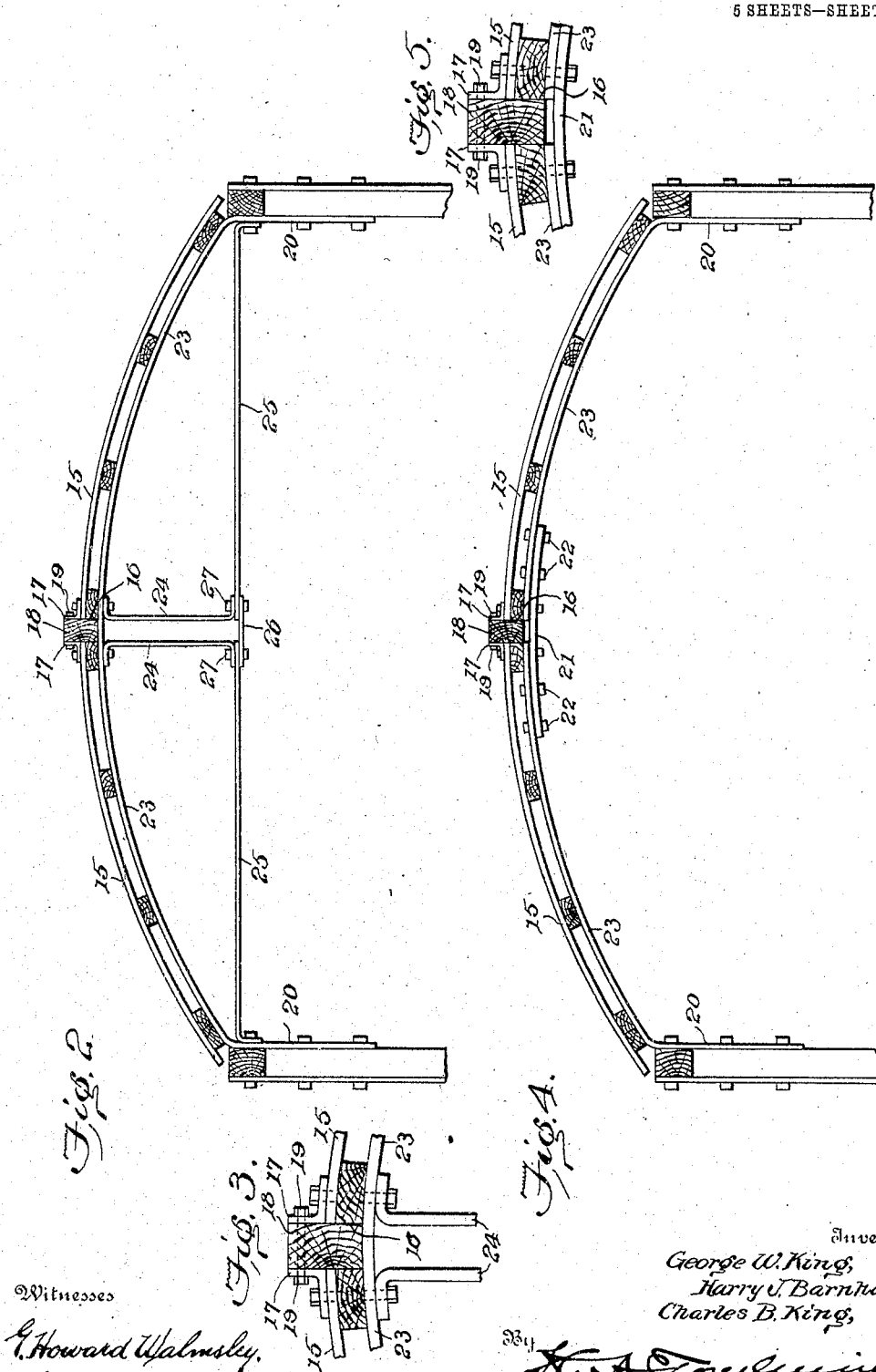

5 SHEETS—SHEET 3.

Witnesses
G. Howard Walmsley
Irvine Miller

Inventors
George W. King,
Harry J. Barnhart,
Charles B. King,
By H. A. Toulmin,
Attorney No. 791,151. PATENTED MAY 30, 1905.
G. W. KING, H. J. BARNHART & C. B. KING.
STEAM SHOVEL.
APPLICATION FILED JUNE 24, 1904.
5 SHEETS—SHEET 4.
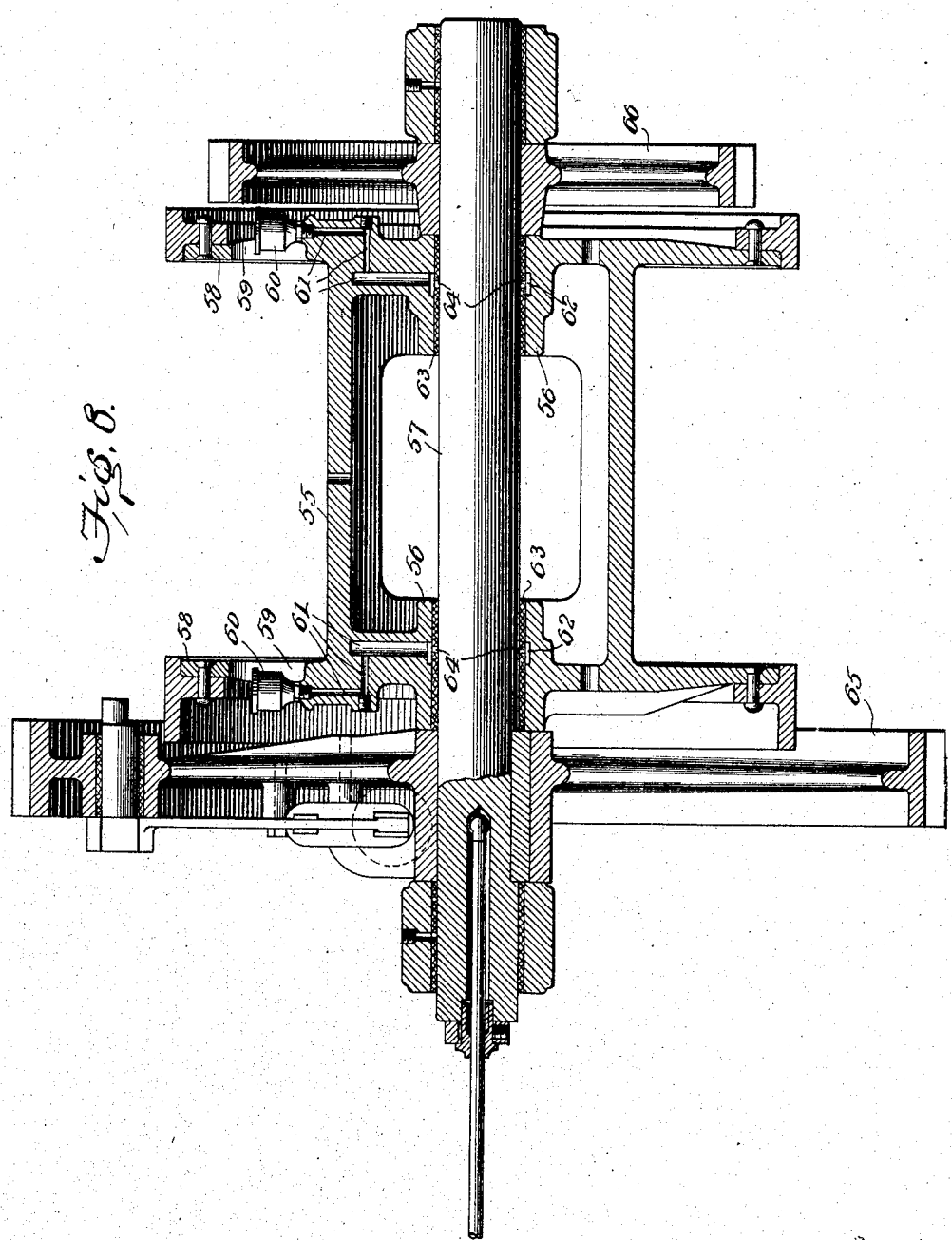
Witnesses
G. Howard Walmsley.
Irvine Miller.
Inventors
George W. King,
Harry J. Barnhart,
Charles B. King,
By 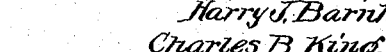
Attorney

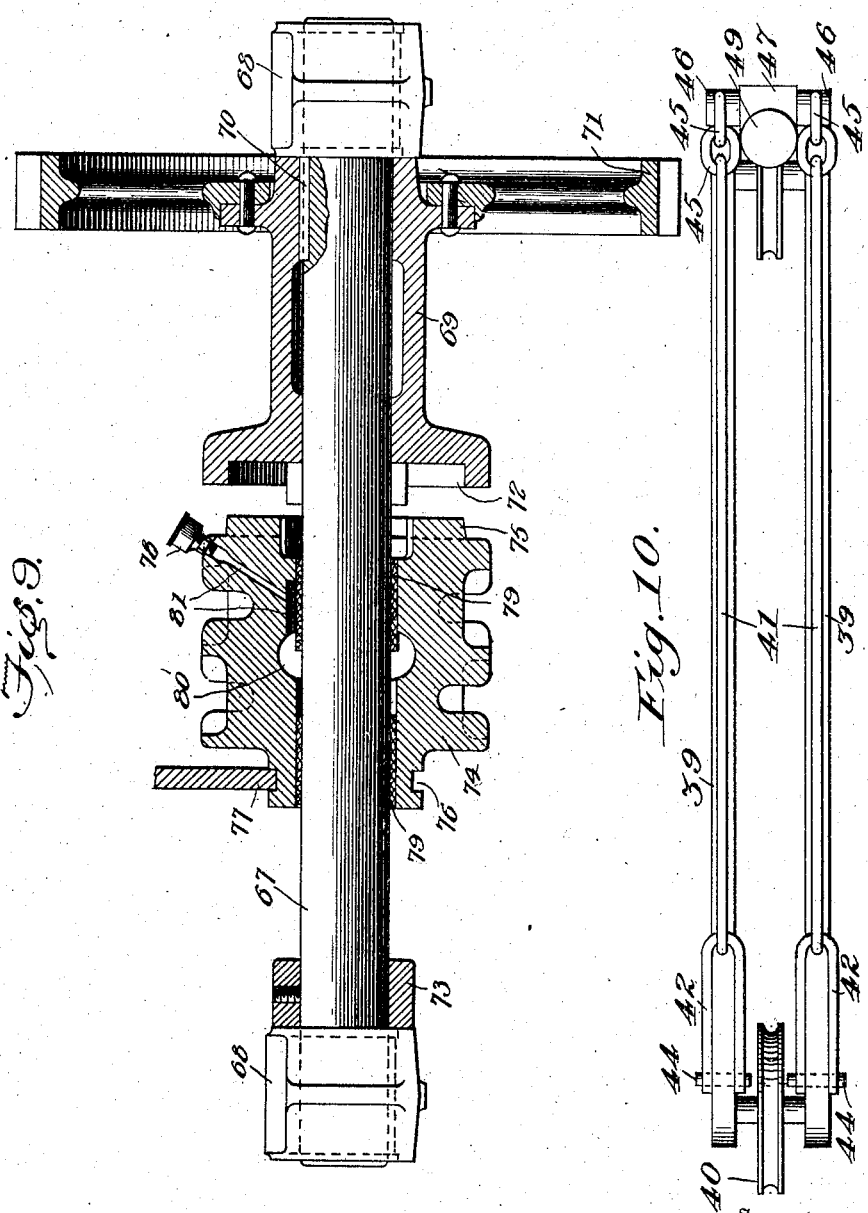

No. 791,151. Patented May 30, 1905.

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

STEAM-SHOVEL.

SPECIFICATION forming part of Letters Patent No. 791,151, dated May 30, 1905.

Application filed June 24, 1904. Serial No. 213,933.

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Steam-Shovels, of which the following is a specification, reference being had therein to the accompanying drawings.

This invention relates to steam-shovels, and more particularly to certain features in connection with the means for supporting the A-frame in working position and lowering it into shipping position; to certain improvements in the construction of the front end of the boiler; to certain novel features in connection with the boom-supporting rods; to certain novel features in the construction of the coal-box and its cover; to certain novel features in connection with the hoisting-drum, and to certain novel features in connection with the propelling-gear.

The particular features of novelty will be hereinafter more fully described, and particularly pointed out in the claims.

Figure 7:
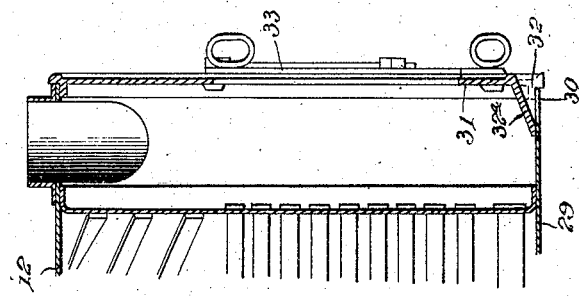
Figure 6:
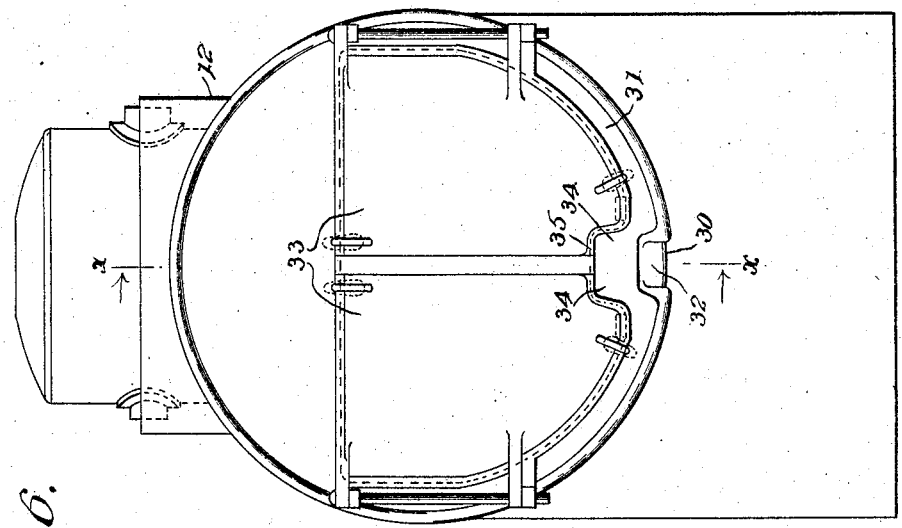

In the accompanying drawings, Figure 1 is a side elevation of a steam-shovel, partly in longitudinal section, embodying our invention in one form. Fig. 2 is a detail sectional view through the roof, illustrating the construction of one of the arches. Fig. 3 is an enlarged view of a portion of Fig. 2. Fig. 4 is a view illustrating another form of arch. Fig. 5 is an enlarged view of a portion of Fig. 4, similar to Fig. 2. Fig. 6 is a front elevation of the boiler. Fig. 7 is a detail sectional view of the same, taken on the line $x\ x$ of Fig. 6 and looking in the direction of the arrows. Fig. 8 is a detail vertical sectional view of the hoisting-drum. Fig. 9 is a similar view of the propelling-gear, and Fig. 10 is a plan view of the boom and its supporting-rods.

Referring first to those features of our invention which relate to the raising and lowering of the A-frame, it should be stated that steam-shovels of this class are frequently shipped from point to point along railways where bridges or tunnels so limit the available height or clearance that it is not possible to allow the A-frame to remain in its ordinary elevated or working position. Our present invention contemplates a construction which obviates the necessity of removing the frame and permits it to be readily lowered into a position where it will safely pass through tunnels and bridges having the usual height. In this construction, figure 1 represents the A-frame, which is pivoted in the usual manner to a transverse supporting-sill 2, as indicated at 3. To the upper end of the A-frame 1 there is pivoted at 4 a back leg or guy 5, connected to the A-frame at its upper and forward end. When the A-frame is in its normal or working position, as shown in full lines in Fig. 1, the lower rear end of the back leg is pivoted at 6 by means of a suitable pin, which is readily removable, to the upper front ends of two parallel connecting-bars 7, the rear lower ends of which are secured at 8 to an anchor-casting 9.

10 indicates a casting mounted on the frame or body 11 of the machine and serving to support the front end of the boiler 12. This supporting-casting 10 has an opening formed through it, through which the connecting-bars 7 pass, said bars being permanently and rigidly held in position by the said casting 10 and the anchor-casting 9 to prevent the joint at 6 from buckling. When it is desired to lower the frame, the back leg 5 is disconnected at the joint 6 and a pair of coupling-bars 13 (shown in dotted lines in Fig. 1) are connected at their rear ends to the connecting-bars 7 and at their forward ends to the back leg 5, the A-frame being lowered into the position shown in dotted lines in Fig. 1 and being held in that position by the coupling-bars with the back leg resting upon the swinging drum 14. The A-frame is thus firmly supported in this lowered position, and the change from the raised to the lowered position and conversely can be readily and conveniently made. The drum 14 is termed the "swinging drum," for the reason that it has connected to it the cables, chains, or other means whereby the swinging circle or turn-table is actuated to swing the boom to one side or the other.

It will be noted that the back leg 5 extends up through the roof of the machine when the A-frame is raised or in working position. In order to accommodate the machine to this position of the parts and to permit the lowering of the A-frame and back leg hereinbefore referred to, the roof 15 is provided at its forward end with a central longitudinal slot or opening 16. Upon each side of this slot or opening there is secured to the top of the roof an angle-bar 17, and in the slot or opening 16 there is located a filling-block 18, preferably of wood, removably secured in position by means of bolts 19, passing through the vertical flanges of the angle-bars 17 and through the filling-block. This filling-block when in place closes the slot or opening in the roof and gives rigidity to that portion of the roof structure in which the slot is formed. Those of the supporting-arches of the roof which are located in front of the normal position of the back leg, which arches are indicated by the reference-numeral 20, must be divided or formed in two parts to permit the lowering of the back leg, and in order to give the structure the necessary solidity we provide for the upper ends of each arch 20 a splice-bar 21, removably connected to the ends of the arch-sections by bolts 22, so as to firmly unite the two parts or sections of the arch when in place. It will be understood, of course, that the filling-block and splice-bars 21 will be removed prior to the operation of lowering the back leg. The first arch back of the point where the back leg passes through the roof when in working position is indicated by the reference-numeral 23 and is provided with two downwardly-extending guide plates or bars 24, having a space between them to receive the back leg and prevent lateral motion thereof when the machine is at work. Each guide-bar 24 has its lower end connected to the adjacent side of the arch by means of a brace-rod or tie-bar 25, and these brace-rods or bars and the guide-bars 24 are connected when the machine is in working condition by means of a splice-bar 26, secured in position by bolts 27, so as to render it removable. Of course this splice-bar is removed prior to the lowering of the back leg.

In order to permit the employment of a boiler of sufficient size and of the desired horizontal locomotive type, providing at the same time ample room at the rear of the boiler to form a firing-space, as indicated at 28, the arrangement of the parts is such that the connecting-bars 7, which form practically a part of the back leg, pass upward and forward within the circle defining the boiler-front. To effect this, the shell or body of the boiler (indicated by the reference-numeral 29) is recessed or cut away at the front end of its lowermost portion, as indicated at 30, and the smoke-ring 31 is similarly recessed, as shown at 32, and is provided with a downwardly and an inwardly inclined projection 32ᵃ to close the space formed by notching or cutting away the shell at 30. The boiler-front is provided with the usual doors 33, hinged at their outer edges, and in order to permit these doors to swing open without contacting with the back leg each door has its lower inner edge recessed or cut away, as indicated at 34. The smoke-ring 31 is provided with an upwardly-extending projection 35, which closes the space formed by cutting away the corners of the smoke-doors, thus causing the smoke-box to be entirely closed when the smoke-doors are shut. By reason of this construction compactness is obtained without interfering with the free opening of the smoke-doors.

The boom (shown more particularly in Figs. 1 and 10 and indicated as a whole by the reference-numeral 36) is pivoted at 37 to the swinging circle 38 and is composed of two parallel members 39, supporting at their upper and outer ends the sheave 40. This boom is supported from the A-frame by means of two rods 41, each rod being provided at its forward end with a clevis 42, connected to the rod by means of an eye 43, the free ends of the arms of the clevis embracing the corresponding boom member 39 and being connected thereto by means of a pin 44, which passes through the boom member and through the ends of the clevis. At its rear end each rod 41 is connected, by means of links 45, with the pin 46 of the yoke 47, which is swiveled on the upper end of the A-frame. By reason of this construction the connection between the A-frame and boom is made more flexible, and crystallization and consequent breakage are reduced to a minimum. It will be noted that the pins 44, by which the forward ends of the rods are connected to the boom, are located some little distance back of and below the axis 48 of the sheave 40, and by reason of this construction the pull upon the journal 49 at the upper end of the A-frame is more nearly at right angles to said journal, thus reducing the strain on the retaining device, which holds the yoke 47 in position on said journal.

Referring now to the construction of the hoisting-drum, it should be noted that great difficulty has heretofore been found in the lubrication of the bearings of said drum by reason of the fact that it has been considered impracticable to employ grease-cups, since they would be liable to be knocked off by the hoisting-chain. To remedy this difficulty, we employ the construction shown more particularly in Fig. 8, in which the drum, comprising a body proper, 55, with bearing-hubs 56, is mounted loosely on the drum-shaft 57 and has at each end a head or flange 58. In each of said heads or flanges there is formed a recess or opening 59, in which is located a grease-cup 60, which lies within the recess or opening out of the way of the hoisting-chain, so that it will not be liable to be struck by said chain and broken or knocked off. From each grease-cup a passage 61 extends through the body of the drum down to the corresponding hub 56, which is provided with an annular groove or recess 62, with which the passage 61 communicates. A suitable bushing 63 is located in each hub and is provided with a plurality of apertures 64, through which the lubricant can pass from the annular recess or channel 62 to the bearing-surfaces of the shaft and bushing. The shaft 57 has secured on it at one end of the drum the gear-wheel 65, by means of which said shaft is driven, and at the other end of the drum the gear-wheel 66, from which the propelling-shaft is driven, the hubs of these gear-wheels abutting against the hubs of the drum, so that it has heretofore been difficult to lubricate the bearings of the drum upon the shaft. By reason of the construction just described these bearings may be kept properly lubricated, while the grease-cups are protected from injury.

Referring next to the propelling mechanism, (shown more particularly in Fig. 9,) 67 indicates a propelling-shaft, which may be either a stationary or a rotating shaft, the latter form being shown in the present instance and deemed preferable. It is supported in bearings 68 and has secured thereon at one end a sleeve 69, (shown in the present instance as fastened to the shaft by a key 70.) To one end of this sleeve is secured the gear-wheel 71, which meshes with the gear-wheel 66 of the hoisting-drum shaft 57. On the other end of the sleeve 69 is formed or secured a clutch member 72. The sleeve 69 abuts against one of the bearings 68, so as to prevent longitudinal motion of the shaft 67 in one direction, and a collar 73, secured on the shaft near its other end, abuts against the other bearing 68 and prevents longitudinal motion of the shaft in the other direction. 74 indicates a pocket-sheave or sprocket-wheel mounted loosely on the shaft 67, so as to be free to move longitudinally on said shaft and also free to permit the shaft to turn independently of it when not clutched thereto in the manner hereinafter described. This pocket-sheave is provided at the end thereof adjacent to the sleeve 69 with a clutch member 75, adapted to engage the clutch member 72. At its other end the pocket-sheave 74 is provided with an annular groove 76 to receive the yoke or collar 77 of the shifting device, by means of which said pocket-sheave is moved longitudinally on the shaft. When so moved as to bring the clutch members 72 and 75 into engagement with each other, it will be seen that the rotary motion of the gear 71 is transmitted through the sleeve 69 and the clutch members directly to the pocket-sheave without placing any torsional strain upon the shaft 67. Heretofore it has been customary to key the gear 71 directly to the shaft and to employ a sliding clutch splined upon the shaft to engage with the pocket-sheave, thus not only placing a torsional strain upon the shaft, but also requiring a spline-and-groove connection between the clutch and shaft, which we are able to dispense with by the construction just described.

The lubrication of the pocket-sheave is effected by means of a grease-cup 78, mounted at one end of said sheave at the angle or corner formed by the meeting surfaces of the periphery and end of the sheave, the cup standing at an angle, as shown, so as to be out of the way of the driving-chains. The sheave is provided with bushings 79 at each end, with an intervening space between them, and the body of the sheave is provided with an annular recess or channel 80 in the central portion of its inner face, to which the lubricant-passage 81 extends from the grease-cup 78 through the body of the sheave. By reason of this construction the lubrication of this pocket-sheave, which has always been difficult to accomplish, is readily effected.

We do not wish to be understood as limiting ourselves to the precise details of construction hereinbefore described, and shown in the accompanying drawings, as it is obvious that various modifications may be readily made without departing from the principle of our invention.

Having thus fully described our invention, what we claim as new, and desire to secure by Letters Patent, is—

1. In a steam-shovel or the like, an A-frame pivotally mounted so as to swing forward, in combination with a back leg or guy comprising two separable portions, one pivoted to the A-frame and the other secured to the car-body, and a removable coupling adapted to be secured to the separated ends of the two portions of the back leg to lengthen the same and support the A-frame in its lowered position, substantially as described.

2. In a steam-shovel or the like, a body, and an A-frame pivotally mounted thereon so as to swing forward, in combination with a back leg or guy comprising two separable portions, one pivoted to the A-frame and the other rigidly secured to the car-body, and a removable coupling adapted to be pivotally secured to the separated ends of the two portions of the back leg to lengthen the same and support the A-frame in its lowered position, substantially as described.

3. In a steam-shovel or the like, a body provided with a swinging drum, and an A-frame pivotally mounted on the body in front of the swinging drum so as to swing forward, in combination with a back leg or guy comprising two separable portions, one pivoted to the A-frame and the other secured to the car-body, and a removable coupling adapted to be pivotally secured to the separated ends of the two portions of the back leg to lengthen the same and support the A-frame in its lowered position, the front portion of the back leg being supported on the swinging drum when the parts are lowered, substantially as described.

4. In a steam-shovel or the like, a body provided with an anchor-casting and a boiler-supporting casting located in front of and above the anchor-casting and provided with an aperture, in combination with an A-frame, and a back leg therefor comprising a forward portion connected to the A-frame, and a rear portion secured to the anchor-casting, passing through the aperture in the boiler-supporting casting, and connected to the rear end of the front portion, substantially as described.

5. In a steam-shovel or the like, a body provided with a roof having a longitudinal slot or opening for the A-frame back leg, and a removable filling fitting said slot, substantially as described.

6. In a steam-shovel or the like, a body having a roof provided with a longitudinal slot or opening for the A-frame back leg, angle-bars mounted on the roof on each side of said slot, a removable filling fitting in said slot and between the angle-bars, and bolts passing through the angle-bars and filling, substantially as described.

7. In a steam-shovel or the like, a body having a longitudinally-slotted roof, divided arches supporting the same, and removable splice-bars connecting the divided ends of the arches, substantially as described.

8. In a steam-shovel or the like, a body having a longitudinally-slotted roof, a divided arch supporting the same, vertical guide-bars extending downward from the divided ends of the arch on each side of the back leg, and a removable splice-bar connecting the lower ends of said guide-bars, substantially as described.

9. In a steam-shovel or the like, a body having a longitudinally-slotted roof, in combination with a divided arch supporting the same, guide-bars extending downward from the inner ends of the arch-sections on each side of the back leg, tie bars or braces connecting the lower ends of said guide-bars to the corresponding arch-sections, and a removable splice-bar connecting the guide and tie bars lying on opposite sides of the back leg with each other, substantially as described.

10. In a steam-shovel or the like, a body having a horizontal boiler mounted thereon, and an inclined A-frame back leg secured to said body below the boiler, the boiler-front being notched to straddle the back leg, substantially as described.

11. In a steam-shovel or the like, the combination, with a body having a horizontal boiler mounted thereon, of an inclined A-frame back leg, the boiler-front being notched to straddle the back leg, and said front being provided with smoke-doors hinged at their outer edges and having the lower portions of their inner edges notched or cut away to swing out without contacting with the back leg, substantially as described.

12. In a steam-shovel or the like, an A-frame provided with a swiveled yoke and pin, in combination with a boom comprising two parallel members, and two boom-support rods, each provided at its rear end with links whereby it is connected to the yoke-pin, and each having at its forward end a clevis pivotally connected thereto at its bend or arch, said clevis embracing the corresponding boom member and being pivotally connected thereto, substantially as described.

13. In a steam-shovel or the like, an A-frame provided with a yoke swiveled thereon, in combination with a boom provided with sheave at its upper end, and boom-support rods connected at their rear end to the yoke and at their forward end to the boom at a point below and back of the sheave, substantially as described.

14. In a hoisting mechanism for steam-shovels and the like, a drum-shaft, and a drum loosely mounted thereon, said drum having flanges or heads provided with recesses, and grease-cups located in said recesses out of the way of the hoisting-chain, the drum-body being provided with passages connecting said grease-cups with the bearings of the drum on the drum-shaft, substantially as described.

15. In a hoisting mechanism for steam-shovels and the like, a drum-shaft and a drum loosely mounted thereon and provided with flanges or heads having recesses, grease-cups mounted in said recesses out of the way of the hoisting-chain, the drum being provided with hubs having bushings therein, the hubs being provided with internal annular grooves and the bushings with registering apertures, and the body of the drum being provided with passages connecting said annular grooves with the grease-cups, substantially as described.

16. In a steam-shovel or the like, a propelling-shaft, in combination with a sleeve mounted on said shaft, a driving-gear secured on said sleeve, said sleeve being provided on one end with a clutch member, a driving-sheave mounted loosely on the propelling-shaft so as to be free to rotate and to move longitudinally relative to said shaft, said sheave being provided at one end with a clutch member adapted to engage the clutch member of the sleeve, and means for moving said sheave longitudinally on the shaft, substantially as described.

17. In a propelling-gear for steam-shovels and the like, the combination, with a propelling-shaft, of a pocket-sheave loosely mounted on said shaft and provided at its ends with separated bushings and an intermediate annular recess or groove, and a lubricator or grease cup mounted on the pocket-sheave at one end thereof, the body of said sheave being provided with a passage connecting said lubricator and the annular recess, substantially as described.

In testimony whereof we affix our signatures in presence of two witnesses.

GEORGE W. KING.
HARRY J. BARNHART.
CHARLES B. KING.

Witnesses:
 CLARENCE B. WESTON,
 HARVEY T. GRACELY.